(12) United States Patent
Oettle

(10) Patent No.: US 8,764,353 B2
(45) Date of Patent: Jul. 1, 2014

(54) REAMER FOR MACHINING A WORKPIECE BY CHIP REMOVAL

(75) Inventor: Matthias Oettle, Bodelshausen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 98 days.

(21) Appl. No.: 13/422,102

(22) Filed: Mar. 16, 2012

(65) Prior Publication Data

US 2013/0071196 A1    Mar. 21, 2013

Related U.S. Application Data

(63) Continuation of application No. PCT/EP2010/063418, filed on Sep. 14, 2010.

(30) Foreign Application Priority Data

Sep. 16, 2009  (DE) .......................... 10 2009 042 395

(51) Int. Cl.
*B23D 77/00*    (2006.01)
*B23D 77/02*    (2006.01)

(52) U.S. Cl.
CPC ................................ *B23D 77/006* (2013.01); *B23D 77/025* (2013.01)
USPC ............. 408/56; 408/144; 408/227; 408/231; 279/7

(58) Field of Classification Search
CPC .............. B23B 31/005; B23B 31/1107; B23B 31/1122; B23B 2222/28; B23B 2222/84; B23D 77/006; B23D 77/025; B23D 2277/02; B23D 2277/205

USPC ........ 408/56, 227, 229, 231, 199, 713; 279/7; 407/11, 30, 33, 47
See application file for complete search history.

(56) References Cited

U.S. PATENT DOCUMENTS

| | | | | |
|---|---|---|---|---|
| 399,349 | A | * | 3/1889 | Sherman ........................ 408/229 |
| 1,040,610 | A | * | 10/1912 | Bocorselski .................. 408/231 |
| 1,475,311 | A | * | 11/1923 | Miller ........................... 408/229 |
| 1,946,869 | A | * | 2/1934 | Miller ............................ 408/231 |
| 1,998,113 | A | * | 4/1935 | Anderson et al. .............. 408/175 |
| 2,623,422 | A | * | 12/1952 | Billingsley, Jr. ............... 408/171 |

(Continued)

FOREIGN PATENT DOCUMENTS

| | | |
|---|---|---|
| CH | 482 486 | 12/1969 |
| DE | 20 2005 007 945 U1 | 10/2005 |

(Continued)

*Primary Examiner* — Eric A Gates
(74) *Attorney, Agent, or Firm* — Saliwanchik, Lloyd & Eisenschenk

(57) ABSTRACT

Embodiments of the invention relate to a reamer for machining a workpiece by chip removal. Embodiments of the reamer can incorporate a holder, having a receiving opening disposed on a workpiece-side end face and having an internal thread, a holder bore extending inside the holder in a longitudinal direction thereof and opening into the receiving opening, an exchangeable head, having a cutting-nose element having a plurality of cutting noses disposed in a distributed manner in a circumferential direction, an exchangeable-head shank having an external thread corresponding to the internal thread disposed in the receiving opening, a bearing contact element disposed between the cutting-nose element and the exchangeable-head shank and having a first bearing contact surface for bearing contact on a first support surface disposed on the workpiece-side end face, with an exchangeable-head bore corresponding to the holder bore extends through the exchangeable head in a longitudinal direction thereof.

15 Claims, 4 Drawing Sheets

(56) References Cited

U.S. PATENT DOCUMENTS

| | | | |
|---|---|---|---|
| 2,936,659 A | | 5/1960 | Gerberding |
| 3,337,936 A | * | 8/1967 | Curry .......................... 408/227 |
| 5,607,263 A | * | 3/1997 | Nespeta et al. ................ 407/61 |
| 6,183,173 B1 | * | 2/2001 | Ritter ............................ 408/59 |
| 7,717,651 B2 | * | 5/2010 | Haberle et al. ................ 408/24 |
| 8,066,457 B2 | * | 11/2011 | Buettiker et al. ............. 409/234 |
| 2003/0143044 A1 | | 7/2003 | Rothenstein |
| 2003/0210963 A1 | * | 11/2003 | Kakai et al. ................... 408/231 |
| 2004/0022594 A1 | * | 2/2004 | Hecht ............................ 408/231 |
| 2007/0067979 A1 | | 3/2007 | Zumsteg et al. |
| 2007/0196188 A1 | * | 8/2007 | Hecht et al. ................... 408/233 |
| 2009/0283975 A1 | * | 11/2009 | Kretzschmann et al. ....... 279/76 |
| 2010/0254777 A1 | | 10/2010 | Schäfer |
| 2010/0272533 A1 | * | 10/2010 | Hecht ............................ 408/153 |
| 2011/0250028 A1 | * | 10/2011 | Zimmerman et al. ......... 408/153 |
| 2011/0262234 A1 | * | 10/2011 | Schuffenhauer et al. ....... 408/56 |

FOREIGN PATENT DOCUMENTS

| | | | | |
|---|---|---|---|---|
| EP | 1 529 587 B1 | 11/2007 | | |
| JP | 2000 288821 A | 3/1999 | | |
| WO | WO 92/06817 A2 | 4/1992 | | |
| WO | WO 2007003248 A1 | * 1/2007 | ............. | B23B 31/11 |
| WO | WO 2007/096861 A1 | 8/2007 | | |
| WO | WO 2007085281 A1 | * 8/2007 | | |

* cited by examiner

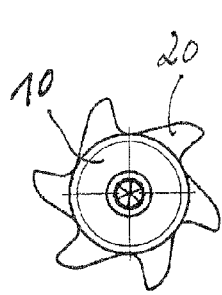
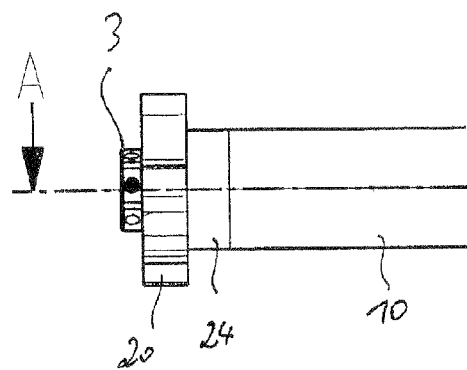
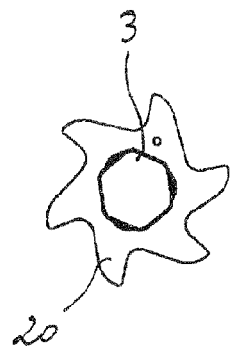
Fig. 6A  Fig. 6B  Fig. 6C
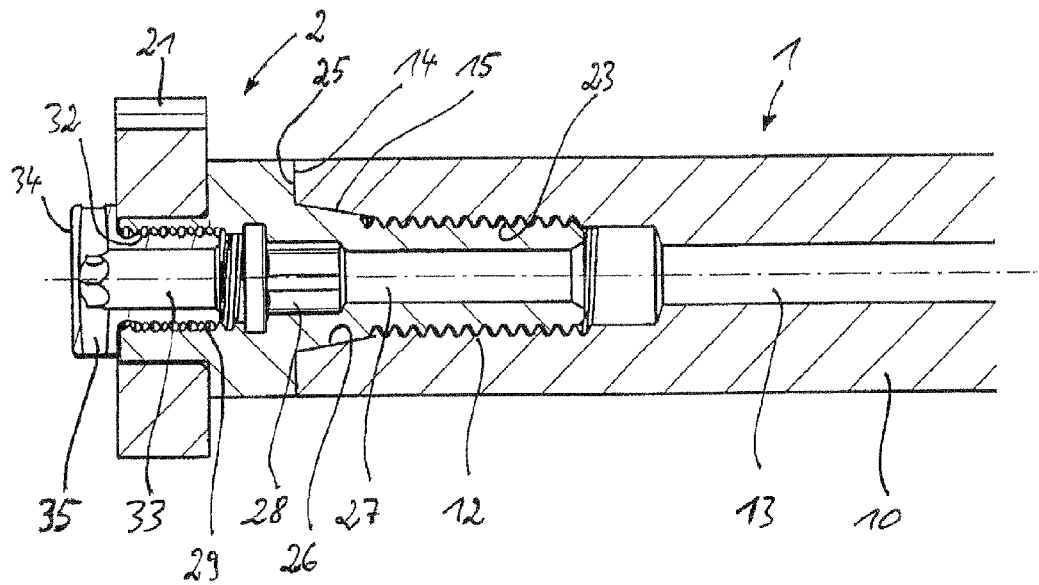
Fig. 7

REAMER FOR MACHINING A WORKPIECE BY CHIP REMOVAL

CROSS-REFERENCE TO RELATED APPLICATIONS

This application is a continuation of international patent application PCT/EP2010/063418 (WO 2011/032921 A1), filed on Sep. 14, 2010 designating the U.S., which international patent application has been published in German language and claims priority from German patent application DE 10 2009 042 395.8, filed on Sep. 16, 2009, each of which is hereby incorporated by reference herein in its entirety, including any figures, tables, and drawings.

BACKGROUND OF INVENTION

The present invention relates to a reamer for machining a workpiece by chip removal, and to an exchangeable head for such a reamer.

Reamers are used for fine machining of cylindrical bores. Such a reamer is described, for example, in EP 1 529 587 A1. This reamer has a shank and an exchangeable, single-piece head, wherein the exchangeable head has a recess realized in a plane, shank-side front face of a connecting element for the purpose of fastening the exchangeable head on the shank in a centering manner. On an end-face plane surface, the shank has a connecting projection that protrudes in the axial direction from this plane surface and corresponds to the recess of the exchangeable head. On the exchangeable head, the recess realized as a connecting element constitutes an axially central inner cone for centering the exchangeable head on the shank and, on the shank, the connecting projection is a corresponding outer cone. The exchangeable head additionally has a central bore, through which the exchangeable head is fastened to the shank by means of a screw.

BRIEF SUMMARY

Embodiments of the present invention are based on the object of specifying an alternative design of a reamer for machining a workpiece by chip removal, and specifying an alternative exchangeable head for such a reamer.

A first aspect of specific embodiments of the present invention relates to a reamer comprising:
  a holder, having a receiving opening that is disposed on an end face and that has an internal thread, and having a holder bore extending inside the holder in the longitudinal direction thereof and opening into the receiving opening, and
  an exchangeable head, having a cutting-nose element that comprises a plurality of cutting noses disposed in a distributed manner in the circumferential direction, an exchangeable-head shank that comprises an external thread corresponding to the internal thread disposed in the receiving opening of the holder, and a bearing contact element that is disposed between the cutting-nose element and the exchangeable-head shank and that has a first bearing contact surface for bearing contact on a first support surface disposed on the workpiece-side end face of the holder,
  wherein an exchangeable-head bore corresponding to the holder bore extends through the entire exchangeable head in the longitudinal direction thereof.

A further aspect of specific embodiments of the present invention relates to an exchangeable head for such a reamer, wherein the exchangeable head comprises:
  a cutting-nose element that comprises a plurality of cutting noses disposed in a distributed manner in the circumferential direction,
  an exchangeable-head shank that comprises an external thread corresponding to the internal thread disposed in the receiving opening of the holder,
  a bearing contact element that is disposed between the cutting-nose element and the exchangeable head shank and that has a first bearing contact surface for bearing contact on a first support surface disposed on the workpiece-side end face of the holder, and an exchangeable-head bore that extends through the entire exchangeable head in the longitudinal direction thereof and that corresponds to the holder bore.

Unlike the known reamer, the reamer according to specific embodiments of the subject invention has basically only two parts, namely the holder and the exchangeable head. The subject mechanism for fastening the exchangeable head to the holder is attached directly to the exchangeable head itself, such that no additional fastening mechanisms (usually requiring delicate manipulation) such as, for instance, an additional screw, are required. This enables the exchangeable head to be exchanged more easily and more rapidly, and there is less risk of a part being lost during the exchange operation. This also makes it possible to achieve a greater accuracy in positioning the cutting element in relation to the holder, since fewer parts are involved for the purpose of positioning.

In a preferred design, it is provided that a tool engagement mechanism is provided in the exchangeable-head bore, in the region of the workpiece-side end. For example, an engagement mechanism can be provided there for a hex key or Torx key, by means of which engagement is effected from the end face, through the exchangeable-head bore, into the tool engagement mechanism for the purpose of screwing the exchangeable head to the holder (or for screwing out the exchangeable head).

In a further design, it is provided that an internal thread is provided in the exchangeable-head bore, in the region of the workpiece-side end. The holder bore and the exchangeable-head bore corresponding thereto are preferably also used to deliver coolant into the workpiece machining region. The internal thread provided in the region of the workpiece-side end of the exchangeable-head bore is then preferably used there for screwing on a coolant distributing element, in particular a coolant distributing screw, as provided in a further design.

This coolant distributing element preferably comprises a distributor shank having an external thread corresponding to the internal thread provided in the exchangeable-head bore, and has a first distributor bore extending in the longitudinal direction of the distributor shank, and has a distributor head comprising second distributor bores extending radially outward from the first distributor bore, such that the coolant is distributed in the radial direction at the end face of the cutting-nose element, i.e. toward the cutting noses. This makes it possible to achieve particularly good distribution of the coolant toward the cutting noses.

Since the coolant distributing element projects beyond the front face of the cutting-nose element, it can be used, preferably, in the machining of through bores and blind bores, provided that it is not necessary to machine as far as the base of the blind bore. If machining is to be effected as far as the base of the blind bore, however, in the case of this design the coolant distributing element can easily be screwed off, with the result that the coolant is then delivered to the cutting-nose element only through the holder bore and the exchangeable-head bore.

In principle, the tool engagement mechanism for engagement of a tool can be placed at any point on the exchangeable-head bore. Preferably, however, it is provided that the internal thread is disposed first in the exchangeable-head bore, as viewed from the end face of the exchangeable head, and that the tool engagement mechanism is provided at the end of the internal thread, i.e. located further inside in the exchangeable-head bore.

Preferably, the distributor shank can be screwed fully into the exchangeable-head bore, and the distributor head is of a flat design in comparison with the length of the distributor shank. As a result, even blind bores can be machined as extensively as possible, as far as the base, without removal of the distributing element.

A particularly good central positioning of the exchangeable head in relation to the holder and an improved torque driving are achieved by a conical-plane bearing contact, wherein a conical, second bearing contact surface is provided between the external thread, disposed on the holder-side end of the exchangeable-head shank, and the bearing contact element on the exchangeable-head shank, and wherein a corresponding conical, second support surface is disposed in the receiving opening of the holder.

A particularly high degree of stiffness and positioning accuracy can be achieved in that the exchangeable head is realized as a single piece and is composed entirely of hard metal or of steel with attached, in particular soldered-on, cutting noses. Alternatively, however, it is also conceivable for the exchangeable head to be realized as two pieces, wherein the exchangeable-head shank and the bearing contact element are realized as a single piece and are composed of steel, and wherein the cutting-nose element is composed entirely of hard metal or of steel with attached, in particular soldered-on, cutting noses.

In the case of the latter design, it is further provided, preferably, that the cutting-nose element is fixedly connected to the bearing contact element, wherein the bearing contact element has a coupling projection, in particular having a polygonal cross section, on the side that is opposite the exchangeable-head shank, wherein the cutting-nose element has a central bore having a cross section corresponding to the cross section of the coupling projection, and wherein the cutting-nose element is fitted onto, in particular pressed onto, the coupling projection by means of the central bore. This design, likewise, serves to improve the stiffness and positioning accuracy.

Differing designs can also be used for the holder. In one design, the holder is realized as a single piece and is composed entirely of hard metal or cermet. In an alternative design, the holder is realized as two pieces, consisting of a holder shank and of a bearing contact ring disposed in a fixed manner on the end face of the holder shank, at the workpiece-side end, wherein the holder shank is composed of steel and the bearing contact ring is composed entirely of hard metal, and wherein the bearing contact ring has a through bore having a support surface for supporting a bearing contact surface disposed on the exchangeable-head shank. The choice of the actual design of the holder, like the choice of the actual design of the exchangeable head, depends on the desired stiffness and positioning accuracy, but is ultimately also a matter of cost.

BRIEF DESCRIPTION OF DRAWINGS

The invention is explained more fully in the following with reference to exemplary embodiments, which are represented in the drawings but which do not limit the invention. In the drawings:

FIG. 6 shows, respectively, a front view, a side view and a back view of the reamer shown in FIG. 5, FIG. 7 shows a sectional representation through the reamer shown in FIG. 5.

DETAILED DISCLOSURE

Figure 1:
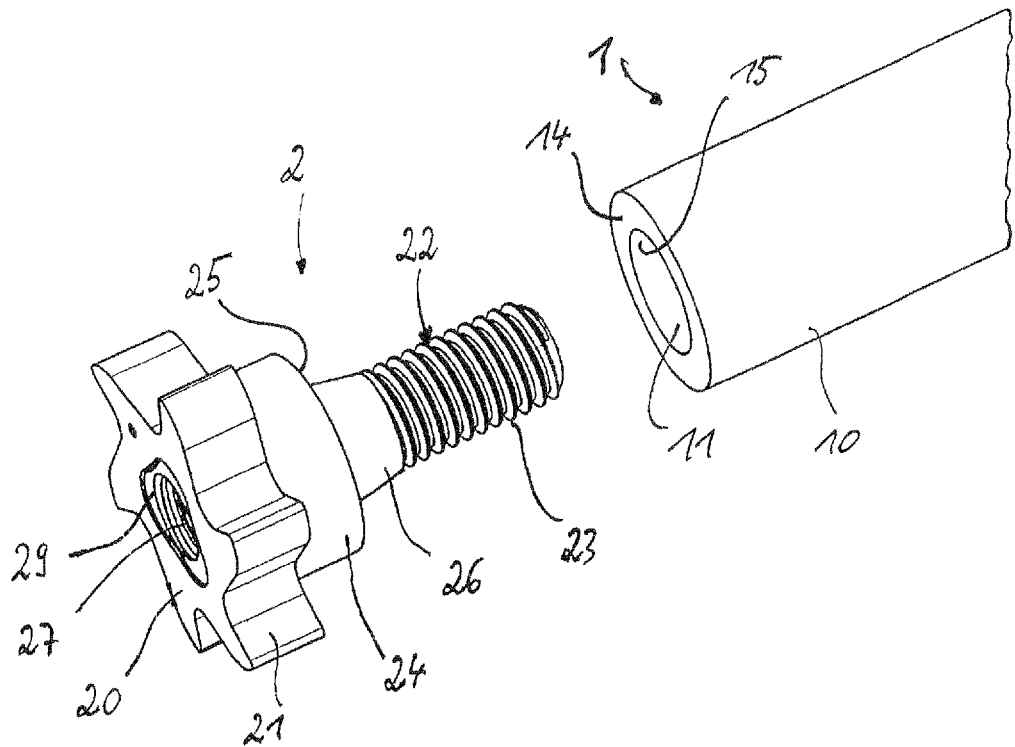
FIG. 1 shows an exploded representation of a first embodiment of the reamer according to the invention.

FIG. 1 shows an exploded representation of a first embodiment of a reamer according to the invention, comprising a holder 1 and an exchangeable head 2. At an end face, at the end of its shank 10 that faces toward the exchangeable head, the holder 1 has a receiving opening 11 having an internal thread 12 (not visible in FIG. 1; see FIG. 7), and has a holder bore 13 (see FIG. 7) extending in the longitudinal direction of the holder 1 and opening into the receiving opening 11. In the case of this embodiment, the holder 1 is realized as a single piece and is composed entirely of hard metal but, in principle, can also be composed of steel.

Figure 3:
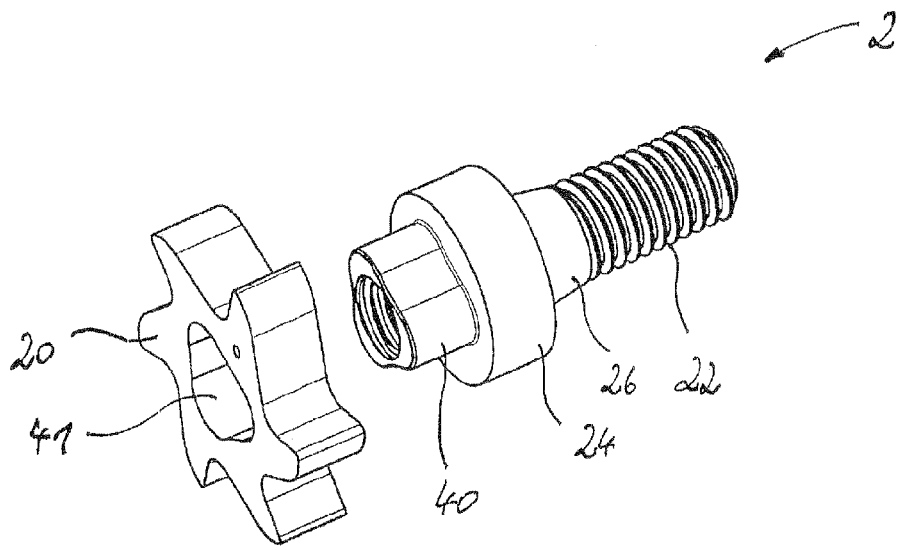
FIG. 3 shows an exploded representation of an embodiment of the exchangeable head according to the invention.

The exchangeable head 2 (also shown in FIG. 3) has a cutting-nose element 20 that comprises a plurality of cutting noses 21 disposed in a distributed manner in the circumferential direction, an exchangeable-head shank 22 that comprises an external thread 23 corresponding to the internal thread 12 disposed in the receiving opening 11 of the holder 1, and a bearing contact element 24 that is disposed between the cutting-nose element 20 and the exchangeable-head shank 22 and that has a first bearing contact surface 25 for bearing contact on a first support surface 14 disposed on the workpiece-side end face of the holder 1. In addition, provided between the bearing contact element 24 and the exchangeable-head shank 22 there is a second, conical bearing contact surface 26, which acts together with a corresponding conical, second support surface 15, (see FIG. 7) on the inner surface of the receiving opening 11 of the holder 1, such that a stable and highly precise conical-plane bearing contact ensues between exchangeable head 2 and holder 1 when the exchangeable head 2, as shown in FIG. 1, is screwed to the holder 1 for the purpose of machining a workpiece by chip removal.

An exchangeable-head bore 27 (see, in particular, FIG. 7) corresponding to the holder bore 13 extends through the entire exchangeable head 2 in the longitudinal direction thereof. This exchangeable-head bore 27 serves, together with the holder bore 13, to deliver coolant, through the holder 1 and the exchangeable head 2, to the workpiece (not shown), or the cutting element 20. In the case of the embodiment shown in FIGS. 1 and 2, the coolant then emerges from the exchangeable-head bore 27 at the workpiece-side end of the cutting element 20.

Provided in the region of the workpiece-side end of the exchangeable-head bore 27 there is a tool engagement mechanism 28 (see, in particular, FIG. 7), which can be designed, for example, for engagement of a hex key or a Torx key, by means of which the exchangeable head 2 can be screwed to or released from the holder 1. This tool engagement mechanism 28 is preferably not disposed directly on the workpiece-side end of the exchangeable-head bore 27, but is disposed somewhat inside, for example—as shown in FIG. 7—in the region of the bearing contact element 24 and the second bearing contact surface 26. In addition, between this tool engagement mechanism 28 and the workpiece-side end of the exchangeable-head bore 27, an internal thread 29 is provided in the exchangeable-head bore 27 to enable a screwing element to be screwed there.

Figure 4:
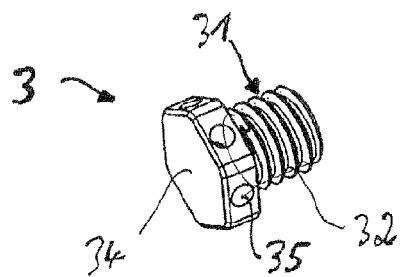
FIG. 4 shows a representation of a coolant distributing element.

For example, a coolant distributing element 3, shown in FIG. 4, can be screwed into this internal thread 29. For this purpose, the coolant distributing element 3 comprises a distributor shank 31, which is provided with an external thread 32 corresponding to the internal thread 29 provided in the exchangeable-head bore 27. Extending in the distributor shank 31 there is a first distributor bore 33 (cf. FIG. 7), which corresponds to the exchangeable-head bore 27, but which is closed toward the workpiece-side end of the distributor element. There, a distributor head 34 is provided, in which second distributor bores 35, extending radially outward from the first distributor bore 33, are provided for the purpose of radially distributing the coolant.

Figure 2:
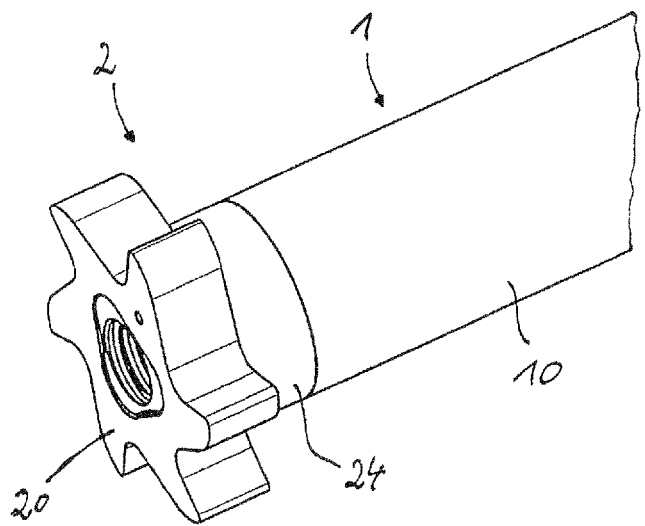
FIG. 2 shows a perspective representation of the first embodiment in an assembled state.

For fine machining of blind bores, the reamer according to the invention is preferably used without the coolant distributing element 3, i.e. in the design shown in FIG. 2. With this design, fine machining can thus be effected as far as the base of the blind bore. If this is not necessary, or if through bores are being machined, the reamer according to the invention is preferably used with a screwed-on coolant distributing element 3, i.e. in the design shown in FIG. 5, which makes it possible to achieve an improved coolant distribution and, consequently, better cooling and removal of chips from the machining region.

Figure 5:
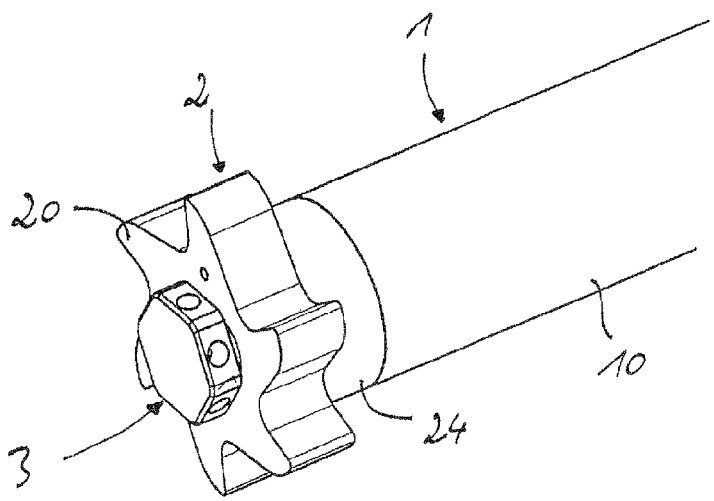
FIG. 5 shows a perspective representation of the first embodiment of the reamer according to the invention with a screwed-on coolant distributing element.

In principle, the coolant distributing element 3 can be screwed on and off by hand. For the purpose of securely fastening the coolant distributing element 3 to the exchangeable head 2, it is provided, preferably, as can be seen in FIGS. 4 and 5, that the distributor head is of such design that it can be screwed on and off with the aid of a tool. In the present case, the distributor head 34 is designed as a hexagon.

As can also be seen from FIG. 4, the distributor head 34, as viewed in the longitudinal direction, is realized so as to be relatively flat in comparison with the distributor shank 31, for example is smaller by a factor of 2 to 10 in the longitudinal direction, in order that machining operations can be performed as deeply as possible in blind bores even when there is a coolant distributing element 3 screwed onto the exchangeable head 2.

In principle, the exchangeable head 2, like the holder 1, can be realized as a single piece and be composed entirely of hard metal. A cost-effective solution, however, is that in which only the cutting-nose element 20 is composed of hard metal, while the exchangeable-head shank 22 and the bearing contact element 24 are composed of steel, these latter, in turn, then being realized as a single piece. Such a design is shown as an exploded representation in FIG. 3. For the purpose of coupling the cutting-nose element 20 to the bearing contact element 24 and the exchangeable-head shank 22, a coupling projection 40 is provided on the bearing contact element 24, on the side that is opposite the exchangeable-head shank 22, which coupling projection is realized as a single piece with the bearing contact element 24 and, in the exemplary embodiment shown, has a polygonal, here a triangular, cross section. The cutting-nose element 20 has a central bore 41 having a corresponding cross section, such that, for the purpose of using the exchangeable head 2, the cutting-nose element 20 is fitted onto, in particular mechanically pressed onto, the coupling projection 40, such that they are connected to each other in a fixed and almost inseparable manner. It is understood that it is also conceivable to use for this purpose other types of connection that have a sufficient stiffness, positioning accuracy and force absorption.

FIG. 6 shows, respectively, a back view (FIG. 6A), a side view (FIG. 6B) and a front view (FIG. 6C) for the purpose of elucidating the structure of the first embodiment of the reamer according to the invention. FIG. 7 shows a corresponding sectional representation along the section line A-A. In particular, the thread, bores and surfaces described above can be seen therein.

Figure 8:
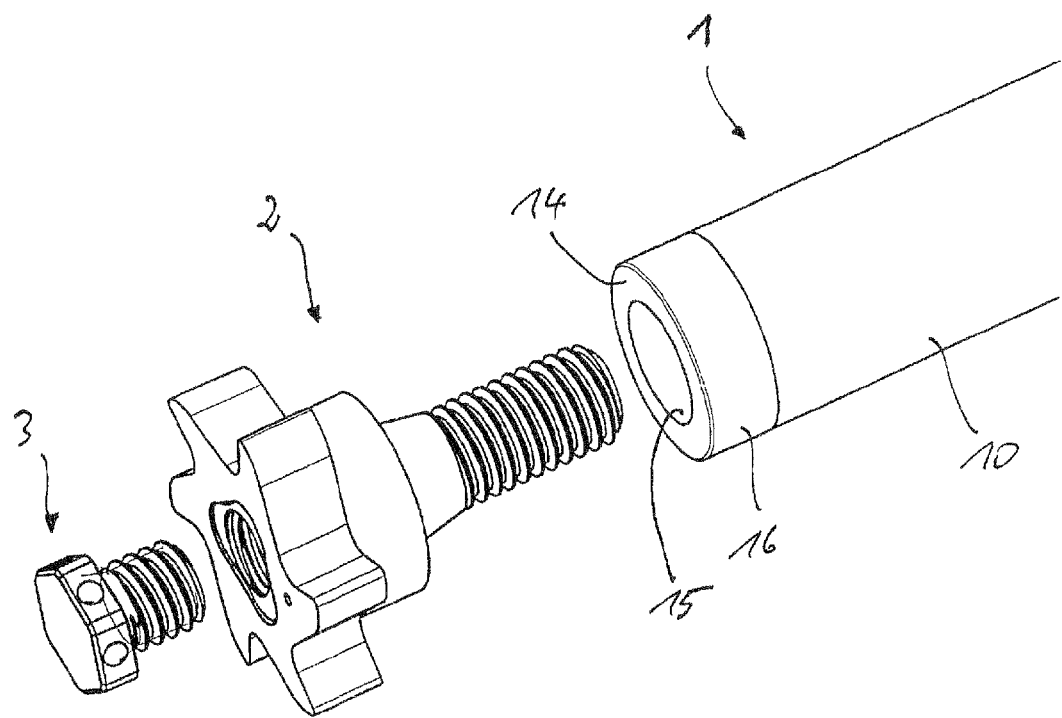
FIG. 8 shows an exploded representation of a second embodiment of the reamer according to the invention with a coolant distributing element.

FIG. 8 shows an exploded representation of a second embodiment of a reamer according to the invention. The essential difference in comparison with the first embodiment consists in that the holder 1 is designed as two parts, namely composed of a holder shank 10 and a bearing contact ring 16. The holder shank 10 in this case is made of steel, while only the bearing contact ring 16 is composed entirely of hard metal, in order to accommodate the desired positioning accuracy and stiffness. In the case of this embodiment, the bearing contact ring 16 also comprises the first bearing contact surface 14 and the second bearing contact surface 15, which are necessary in order to achieve the desired conical-plane bearing contact between the holder 1 and the exchangeable head 2 and which provide for the desired stiffness and positioning accuracy. In other respects, the statements made in respect of the first embodiment apply analogously, such that no further explanations are given at this point.

The invention constitutes a tool that is simple to manufacture and easy to manipulate, and which can be used, in particular, to effect fine machining operations on interior bores. Flexible machining of both blind bores and through bores can be achieved with only a few components, providing for a high degree of positioning accuracy and stiffness.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A reamer for machining a workpiece by chip removal, comprising:
   a holder, wherein the holder has a receiving opening disposed on a workpiece-side end face of the holder, wherein the receiving opening has an internal thread, wherein the holder has a holder bore extending inside the holder in a longitudinal direction thereof and opening into the receiving opening, and
   an exchangeable head, wherein the exchangeable head has (i) a cutting-nose element that comprises a plurality of cutting noses disposed in a distributed manner in a circumferential direction, (ii) an exchangeable-head shank that comprises an external thread corresponding to the internal thread disposed in the receiving opening of the holder, and (iii) a bearing contact element that is disposed between the cutting-nose element and the exchangeable-head shank, wherein the bearing contact element has a first bearing contact surface for bearing contact on a first support surface disposed on the workpiece-side end face of the holder, wherein the exchangeable-head shank and the bearing contact element are realized as a single piece, wherein an exchangeable-head bore corresponding to the holder bore extends through the exchangeable head in the longitudinal direction thereof such that the exchangeable-head bore extends through the exchangeable-head shank and the bearing contact element, wherein the exchangeable-head bore has a second internal thread, wherein the second internal thread is proximate a workpiece-side end of the exchangeable-head bore, wherein a tool engagement mechanism is provided in the exchangeable-head bore proximate the workpiece-side end of the exchangeable head bore, wherein the tool engagement mechanism, as viewed from a workpiece-side end face of the exchangeable head, is disposed at an end of the second internal thread provided in the exchangeable-head bore.

2. The reamer as claimed in claim 1, further comprising a coolant distributing element.

3. The reamer as claimed in claim 2, wherein the coolant distributing element comprises a coolant distributing screw, wherein the coolant distributing screw comprises a distributor shank having a second external thread corresponding to the second internal thread provided in the exchangeable-head bore, a first distributor bore extending in a longitudinal direction of the distributor shank, and a distributor head comprising at least one second distributor bore extending radially outward from the first distributor bore.

4. The reamer as claimed in claim 3, wherein the distributor shank is adapted to be screwed fully into the exchangeable-head bore, and the distributor head is of a flat design in comparison with a length of the distributor shank.

5. The reamer as claimed in claim 1, wherein a conical, second bearing contact surface is provided between the external thread, disposed on a holder-side end of the exchangeable-head shank, and the bearing contact element on the exchangeable-head shank, and a corresponding conical, second support surface is disposed in the receiving opening of the holder.

6. The reamer as claimed in claim 1, wherein the exchangeable head is realized as a single piece and is composed entirely of hard metal or of steel with the plurality of cutting noses attached.

7. The reamer as claimed in claim 6, wherein the plurality of cutting noses are soldered onto the single piece.

8. The reamer as claimed in claim 1, wherein the exchangeable head is realized as two pieces, wherein the exchangeable-head shank and the bearing contact element are realized as a first piece of the two pieces and are composed of steel, and wherein the cutting-nose element is realized as a second piece of the two pieces and composed entirely of hard metal or of steel with the plurality of cutting noses attached.

9. The reamer as claimed in claim 1, wherein the holder is realized as a single piece and is composed entirely of hard metal or cermet.

10. The reamer as claimed in claim 1, wherein the holder is realized as two pieces, comprising a holder shank and a bearing contact ring disposed in a fixed manner on an end face of the holder shank, at a workpiece-side end of the holder shank, wherein the holder shank is composed of steel and the bearing contact ring is composed entirely of hard metal, and wherein the bearing contact ring has a through bore having a second support surface for supporting a second bearing contact surface disposed on the exchangeable-head shank.

11. A reamer for machining a workpiece by chip removal, comprising:

a holder, wherein the holder has a receiving opening disposed on a workpiece-side end face of the holder, wherein the receiving opening has an internal thread, wherein the holder has a holder bore extending inside the holder in a longitudinal direction thereof and opening into the receiving opening, and an exchangeable head, wherein the exchangeable head has (i) a cutting-nose element that comprises a plurality of cutting noses disposed in a distributed manner in a circumferential direction, (ii) an exchangeable-head shank that comprises an external thread corresponding to the internal thread disposed in the receiving opening of the holder, and (iii) a bearing contact element that is disposed between the cutting-nose element and the exchangeable-head shank, wherein the bearing contact element has a first bearing contact surface for bearing contact on a first support surface disposed on the workpiece-side end face of the holder, wherein an exchangeable-head bore corresponding to the holder bore extends through the exchangeable head in the longitudinal direction thereof, wherein the exchangeable head is realized as two pieces, wherein the exchangeable-head shank and the bearing contact element are realized as a single piece of the two-pieces and are composed of steel, and wherein the cutting-nose element is composed entirely of hard metal or of steel with the plurality of cutting noses attached, wherein the cutting-nose element is fixedly connected to the bearing contact element, wherein the bearing contact element has a coupling projection on a side that is opposite the exchangeable-head shank, wherein the cutting-nose element has a central bore having a central bore cross section corresponding to a cross section of the coupling projection, and wherein the cutting-nose element is fitted onto the coupling projection via the central bore.

12. The reamer as claimed in claim 11, wherein the plurality of cutting noses are soldered onto the cutting-nose element.

13. The reamer as claimed in claim 11, wherein the coupling projection has a polygonal cross section.

14. The reamer as claimed in claim 11, wherein the cutting-nose element is pressed onto the coupling projection.

15. An exchangeable head for a reamer for machining a workpiece by chip removal, wherein the reamer comprises a holder, wherein the holder has a receiving opening disposed on a workpiece-side end face of the holder wherein the receiving opening has an internal thread, wherein the holder has a holder bore extending inside the holder in a longitudinal direction thereof and opening into the receiving opening, wherein the exchangeable head comprises:

a cutting-nose element that comprises a plurality of cutting noses disposed in a distributed manner in a circumferential direction, an exchangeable-head shank that comprises an external thread corresponding to the internal thread disposed in the receiving opening of the holder, and a bearing contact element that is disposed between the cutting-nose element and the exchangeable head shank, wherein the bearing contact element has a first bearing contact surface for bearing contact on a first support surface disposed on the workpiece-side end face of the holder, wherein the exchangeable-head shank and the bearing contact element are realized as a single piece, wherein an exchangeable-head bore corresponding to the holder bore extends through the exchangeable head in a longitudinal direction thereof such that the exchangeable-head bore extends through the exchangeable-head shank and the bearing element, wherein the exchangeable-head bore has a second internal thread, wherein the second internal thread is proximate a workpiece-side end of the exchangeable-head bore, wherein a tool engagement mechanism are provided in the exchangeable-head bore proximate a workpiece-side end of the exchangeable-head bore, wherein the tool engagement mechanism, as viewed from a workpiece-side end face of the exchangeable head, is disposed at an end of the second internal thread provided in the exchangeable-head bore.

* * * * *

UNITED STATES PATENT AND TRADEMARK OFFICE
CERTIFICATE OF CORRECTION

PATENT NO.         : 8,764,353 B2
APPLICATION NO.    : 13/422102
DATED              : July 1, 2014
INVENTOR(S)        : Matthias Oettle It is certified that error appears in the above-identified patent and that said Letters Patent is hereby corrected as shown below:

In the Claims

Column 9,
Line 9, Claim 15 "mechanism are provided" should read --mechanism is provided--.

Signed and Sealed this
Fourteenth Day of October, 2014

Michelle K. Lee
*Deputy Director of the United States Patent and Trademark Office*